United States Patent [19]

Sousek et al.

[11] 4,132,941
[45] Jan. 2, 1979

[54] SYNCRO-MATIC CIRCUIT USED WITH MATERIAL SPREADERS

[75] Inventors: Eugene A. Sousek, Appleton; John R. Stroemer, Neenah; Steven L. Whitsitt, Middleton, all of Wis.

[73] Assignee: Koehring Company, Milwaukee, Wis.

[21] Appl. No.: 778,133

[22] Filed: Mar. 16, 1977

[51] Int. Cl.² ............................................. G05B 1/06
[52] U.S. Cl. .................................... 318/663; 318/446; 239/155; 222/76; 222/626
[58] Field of Search ....................... 318/446, 663, 272; 239/155, 156; 222/76, 627, 626, 611

[56] References Cited

U.S. PATENT DOCUMENTS

| | | | |
|---|---|---|---|
| 3,677,540 | 7/1972 | Weiss | 222/76 |
| 3,679,098 | 7/1972 | Weiss | 222/76 X |
| 3,792,709 | 2/1974 | Johnson et al. | 239/156 X |
| 3,825,185 | 7/1974 | Moon et al. | 239/150 |
| 4,023,020 | 5/1977 | Lestradet | 239/155 X |

Primary Examiner—B. Dobeck

[57] ABSTRACT

A vehicle with apparatus for discharging material such as salt on a roadway or the like at a rate that a control system automatically varies with vehicle speed includes means that ordinarily interrupts normal control to prevent discharge of material while vehicle speed is below preselected threshold value. The system also includes a blast circuit which responds to momentary manual operation of a switch to impose a blast signal on control system to override all other control activity to cause rapid dispensing of material for a preselected period even if vehicle is stopped or moving below the threshold speed.

13 Claims, 5 Drawing Figures

SYNCRO-MATIC CIRCUIT USED WITH MATERIAL SPREADERS

BACKGROUND OF THE INVENTION

This invention relates to vehicles having auxiliary mechanisms. It is particularly concerned with auxiliary mechanisms for spreading materials onto roadways.

Vehicles have been heretofore proposed which are provided with auxiliary driven mechanisms, such as devices for dispensing and dispersing materials on the ground during vehicle travel. Such vehicles may commonly be used in urban areas, for example, for spreading sand, salt, chips or the like onto roadways. Devices of this type are illustrated in Sousek et al, U.S. Pat. No. 3,395,866 and Sousek U.S. Pat. No. 3,869,655, the disclosures of both of which patents are incorporated herein by reference.

In a vehicle of this general type it is conventional to employ a power-driven feed auger for dispensing material from a container on the vehicle and a power driven disc for scattering the material as it is dispensed. One or more motors may be provided for driving these auxiliary driven devices.

To control the rate of deposit of material on the roadway, it is known to utilize a control system for automatically regulating the speed of the auxiliary motor which drives an auger for feeding the material. The control system may be in the form of an electrical circuit arranged to regulate the speed of operation of the auxiliary motor in relation to the speed of the vehicle. The purpose of the construction is to maintain the amount of material spread uniform over each unit of distance travelled by the vehicle constant despite variations in vehicle speed.

These known systems are useful, but they have not proved entirely satisfactory in some respects. While the dependence of these systems upon vehicle speed is a desirable feature while the vehicle is moving along a roadway, it is a complicating factor when the operator stops the vehicle or it is desired to spread the material at a higher rate over a portion of vehicle travel. It is known to alleviate this complicating factor by at times permitting by-passing the dependence of material discharge on vehicle speed, as when the vehicle is stationary, by disengaging the automatic control system and manually changing and maintaining the speed of the auxiliary mechanisms to drive the auger dispensing the material. Such a system also allows manual adjustment of the rate of dispensation of material relative to vehicle speed when manual operation is discontinued and automatic operation is resumed. However, if it is wished to retain the original dispensation rate upon resumption of such operation, it is necessary to manually reset the adjustment before the normal automatic control rate is attained. Another problem that may be encountered in prior art equipment of this type is that of insuring that the automatic control does not continue to dispense material when the vehicle is temporarily parked for a time.

SUMMARY OF THE INVENTION

It is the general object of this invention to provide an improved apparatus for dealing with problems of vehicles having auxiliary mechanisms for spreading material on roadways as mentioned above.

Another object of this invention is to provide a normally automatic speed controlled system for dispensing material, which system has features offering improved performance when the vehicle is in a stationary position.

A further object of this invention is to provide an automatic control system for dispensing materials on roadways wherein a blast signal may be manually imposed on the system to cause dispensing of a substantially increased amount of material irrespective of whether the control system would otherwise be dispensing any amount of material or not.

Yet another object of the invention is to provide an automatically controlled system as above where a blast signal as referred to may be manually imposed on the system when the vehicle is stopped at an intersection or the like for automatically increasing a material spreading rate from a base rate to a previously selected increased rate and for automatically maintaining such increased rate for a preselected interval of time after which the system is automatically returned to the base rate.

An additional object of this invention is to provide an automatic speed related material dispensing system with a threshold detecting circuit which operates when the speed of the vehicle is below a predetermined threshold rate to preclude automatic dispensing of the material.

These and other objects are accomplished according to a preferred embodiment of the invention wherein a vehicle is provided with at least one auxiliary driven mechanism, as a material discharge apparatus. The material discharge apparatus preferably includes a feed auger which may be driven by a fluid motor. In order to regulate the rate at which the valve supplies fluid to the motor and thereby regulate the rate of material discharge by the auger, a control system is provided having a control motor in driving connection with the valve. A control circuit is provided for operating the control motor so that the control motor automatically drives the fluid motor at a rate related to the vehicle speed.

The control system may be provided with means for normally comparing direct current voltages determined by the speed of the vehicle and by the position of an adjustable means or member for controlling auxiliary motor means to vary the rate of discharge of material. Means are then provided for supplying a special threshold voltage upon the voltage determined by the vehicle speed falling below a predetermined value. This threshold voltage is employed in the control circuit to ensure that the control motor means for driving the adjustable member places that member in position to ordinarily discontinue discharge of material when the vehicle is stopped. The control system also includes a pushbutton blast feature. Upon manual depression of the "blast" button, a signal is provided which acts to override the effect of other voltages in the control circuit to cause the control motor means to drive the adjustable member to actuate the auxiliary motor to discharge material at an increased rate such as its maximum rate. This blast feature is automatically controlled for a preselected time after which the system is automatically returned to its normal operation related to vehicle speed. The feature may be used to cause discharge of an appropriate amount of material while the vehicle is stopped at an intersection.

The overall control system may, when desired, be turned off of automatic control as described and placed in an off position where no material is discharged or in a manual position where the amount of material discharged is manually selected.

DETAILED DESCRIPTION OF THE PREFERRED EMBODIMENT

Figure 1:
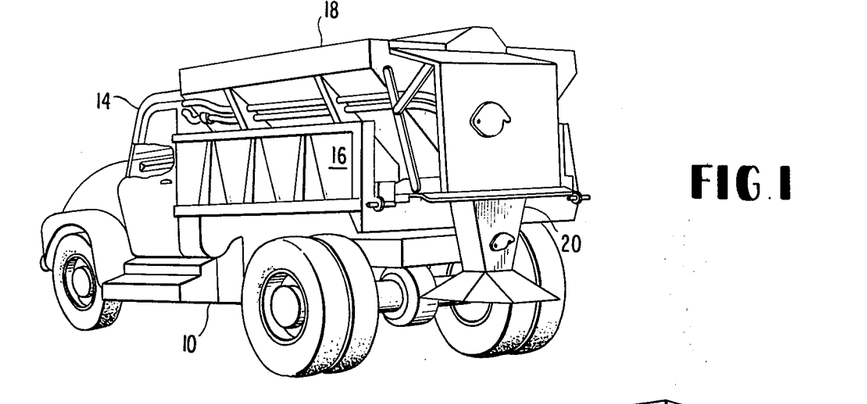
FIG. 1 is a perspective view of a material-spreading vehicle employing the present invention.
Figure 2:
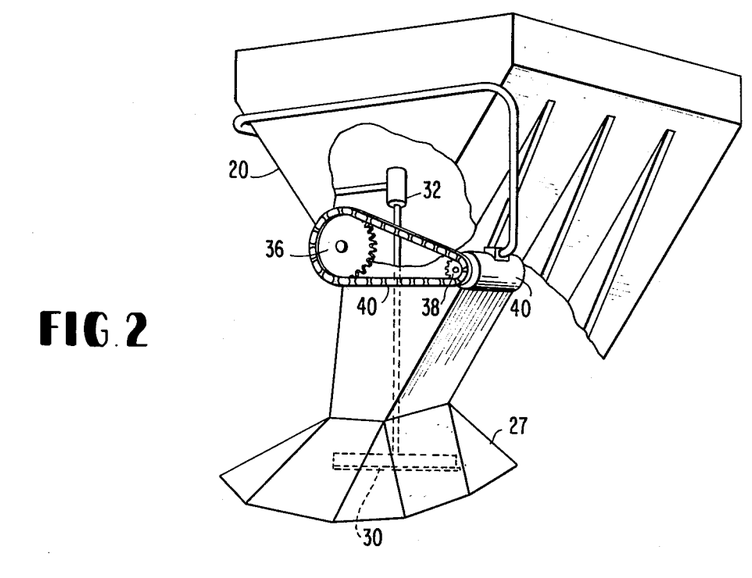
FIG. 2 is a partial view, in perspective, of the rear body portion of the spreader vehicle.

According to a preferred embodiment of the invention as illustrated in FIGS. 1 and 2, a vehicle 10 includes a prime mover 12 for propelling the vehicle and a cab 14 which provides an operator's station having controls for both driving the vehicle and for controlling the operation of an auxiliary driven mechanism, as will be discussed subsequently. The vehicle further includes a frame portion 16 which is mounted on a body 18. The body may be mounted in any suitable manner as discussed in U.S. Pat. No. 3,869,655 to Sousek. The body 18 comprises a spreader unit which is operable to dispense sand, salt, chips, calcium chloride, or other mateirals onto a roadway or the like.

Figure 3:
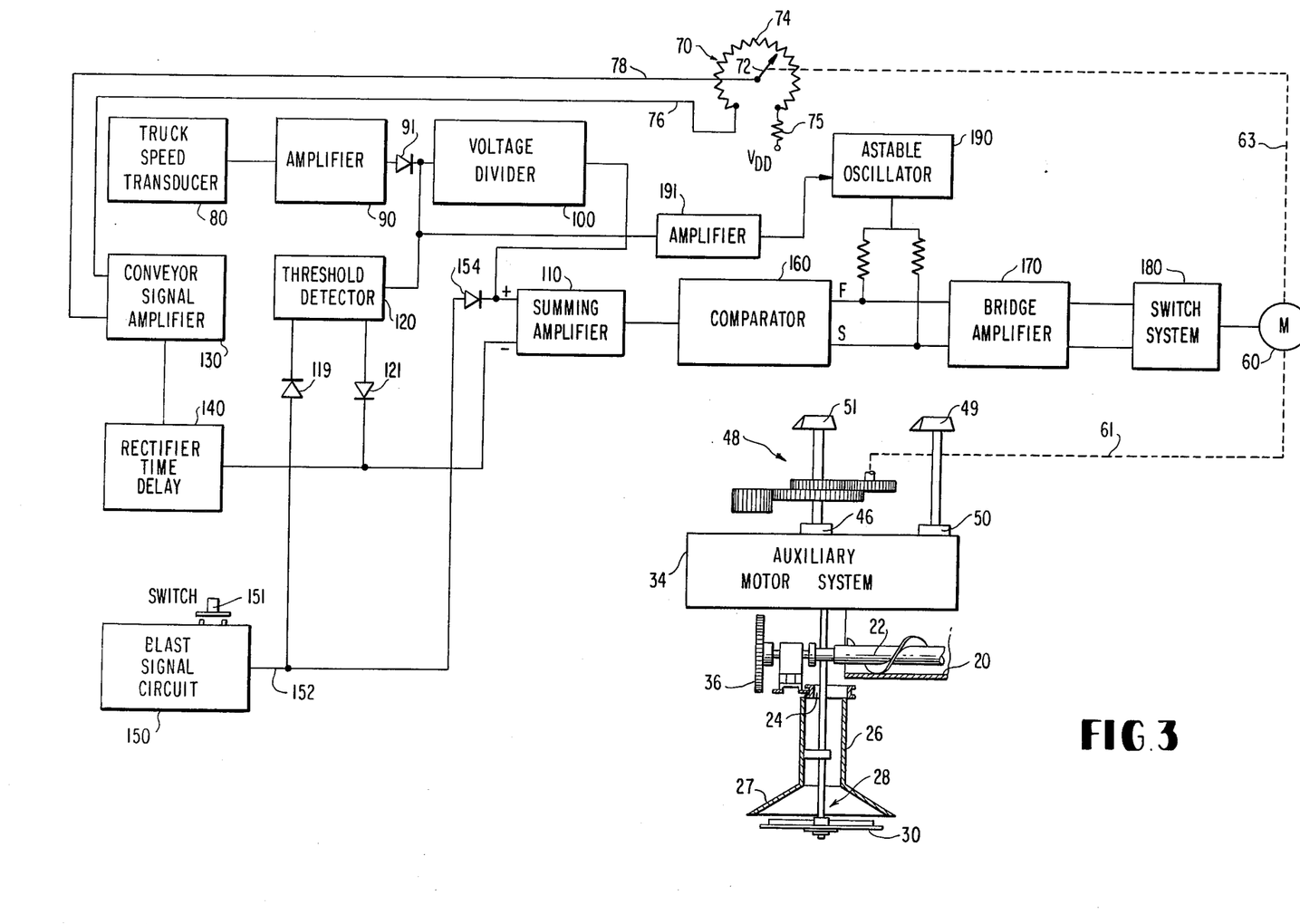
FIG. 3 is a diagrammatic showing of a hydraulically operated spreader mechanism and an electric circuit for controlling its operation.

The spreader includes a container portion of generally truncated triangular configuration which defines a trough 20 at its bottom (see FIG. 3). A conveyor 22 of rotary auger type is disposed in the trough and is operable, upon rotation, to advance material in the trough toward an opening 24 in the rear of the body 18. A vertical housing 26 is disposed at the opening 24 and serves to guide the material downwardly toward a spreader skirt 27 which is attached to the lower end of the housing 26. Suspended within the spreader housing is a rotatable spreader spinner assembly 28. The spinner assembly comprises a spinner disc 30 driven from a fluid motor 32 (FIG. 2) within an auxiliary motor system designated 34 in FIG. 3.

Disposed at the end of the auger conveyor 22 is a driven sprocket wheel 36 which is mechanically linked to a drive sprocket wheel 38 (FIG. 2) by a suitable sprocket chain 40. The drive sprocket wheel 38 is mounted on a shaft which may be driven by a hydraulic motor (not shown) in auxiliary motor system 34 (FIG. 3) to rotate the auger conveyor 22. In order to drive the aforementioned hydraulic auxiliary motor in auxiliary motor system 34, a fluid circuit (not shown) is provided for operation under the control of a valve 36 (FIG. 3), the position of which valve, and thereby the speed of rotation of auger 22, is controlled through gearing 48 by a control system to be described subsequently. There also may be provided a valve 50, which may be manually operable by handle 49, for controlling the speed of an auxiliary motor for driving the spinner 28, and consequently rotating spinner disc 30, at a selected speed. The mechanism for the auger and spinner, along with their control and drive means, as discussed above, are preferably of the same construction as described in detail in the aforementioned U.S. Pat. No. 3,869,655 to Sousek. In fact, gearing 48 may additionally be manually operated in the same manner as in that patent through a handle 51, if desired.

Turning again to FIG. 3, a reversible DC control motor 60 is mechanically coupled as exemplified at 61 to the gearing 48 for adjusting the position of valve 46. Motor 60 further is mechanically coupled as exemplified at 63 to a valve position indicator 70 through potentiometer arm 72. The control motor 60 is operated by the control system for the purpose of coordinating the position of valve 46, and hence the speed of the auxiliary motor driving auger 22 to the speed of travel of the vehicle 10 subject to certain modifications previously mentioned and hereinafter described in detail.

In the control system, a truck speed tranducer 80, associated with the vehicle to be driven at a speed corresponding to the vehicle speed, provides a variable voltage which is applied to amplifier 90 to provide, through a rectifying diode 91, a DC voltage signal with an amplitude proportional to the vehicle speed. This voltage is applied through a voltage divider or adjustable potentiometer 100 to the positive input terminal of a summing amplifier 110. The DC signal from rectifier 91 is also applied to a threshold detector 120 which, when the vehicle is moving at less than a preselected threshold speed, provides a positive signal through a diode 121 to the negative terminal of the summing amplifier to prevent discharge of material.

The valve position indicator or voltage divider 70 includes, in addition to potentiometer arm 72, a circular resistance element 74 over which the arm or wiper 72 moves in electrical engagement. One end of the resistance element 74 is connected through a resistor 75 to the positive terminal $V_{DD}$ of a direct current voltage source (see FIG. 4B) for the control circuit. The other end of the resistance element 74 and the potentiometer arm 72 are connected through conductors 76 and 78, respectively, to a conveyor signal amplifier 130. The output of amplifier 130 is passed through rectifier and time delay circuits at 140 to the negative terminal of the summing amplifier 110. A blast signal circuit 150 is operable in response to momentary closure of manual switch 151 to provide a high voltage signal on line 152 for a preselected short time period. The signal is applied through diode 119 to the threshold detector 120 and, through buffer diode 154 to the positive terminal of the summing amplifier. This blast signal is high and overrides any other signal on the summing amplifier that would tend to limit the amount of material dispensed by the auger 22, including that of the threshold detector, to itself cause dispensation of material at a high rate as will be discussed hereinafter.

The summing amplifier 110 provides an output signal that is normally representative of the relationship between the DC voltage from the voltage divider 100, proportional to vehicle speed supplied to the positive terminal, and a DC voltage from the rectifier and time delay circuit 140 that is representative of the position of the potentiometer arm 72. Because of the mechanical connection previously described of the motor 60 and the auxiliary motor valve 46, the output of the summing amplifier 110 tends to drive the valve to the balance position. The summing amplifier output is also subject to temporarily effects of the threshold detector and the blast signal as is mentioned previously and will be described subsequently in detail.

The output signal of the amplifier is applied to a comparator 160 which applies signals to output lines F and S respectively in accordance with whether the summing amplifier signal shows that the auxiliary motor system should operate the auger 22 to discharge material at a faster or slower rate, respectively. The lines F and S connect to a bridge amplifier 170 which in turn is connected to switch system 180 to control energization of motor 60. The operation of the bridge amplifier and switch system is such as to connect the motor for energization at such polarity as to cause it to drive valve 46 in a direction to slow down the auxiliary motor when slower discharge of material is indicated and to drive the valve in the opposite direction when increased discharge is indicated. Movement of the arm 72 by the motor 60 in synchronism with the valve 46 maintains the conveyor signal amplifier voltage in predetermined relationship to the speed transducer voltage, and, at uniform speed, the motor 60 will normally be unenergized. An astable oscillator 190 may be connected to the input of the amplifier 170 to affect its operation in a manner to be described subsequently. Astable oscillator 190 may also be connected through an amplifier 191 to the DC truck speed voltage signal passing from amplifier 90 through diode 91.

Figure 4A:
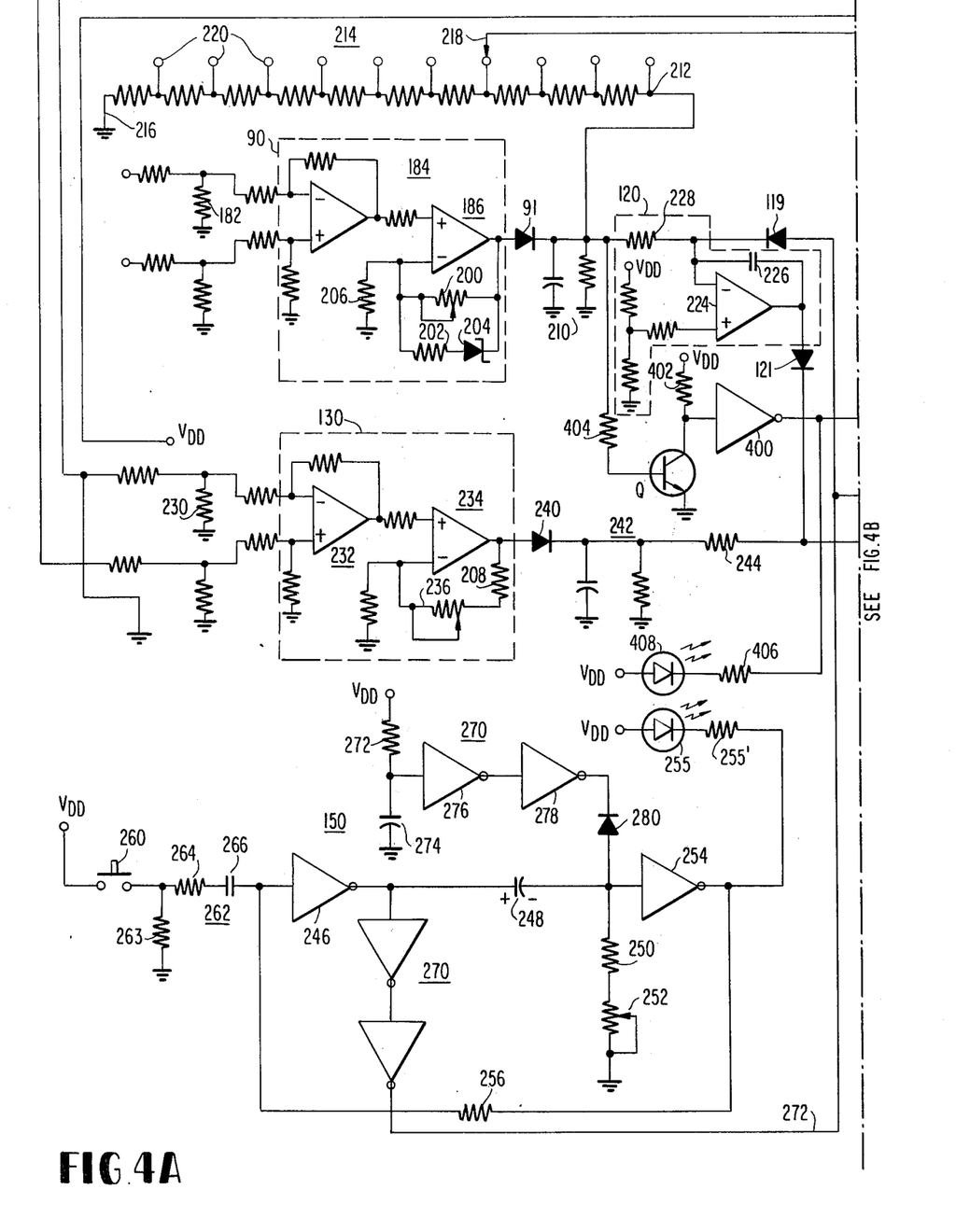
FIGS. 4A and 4B together constitute a detailed schematic diagram of an electric control system for operating the control means in a mechanism similar to that shown in FIG. 3.
Figure 4B:
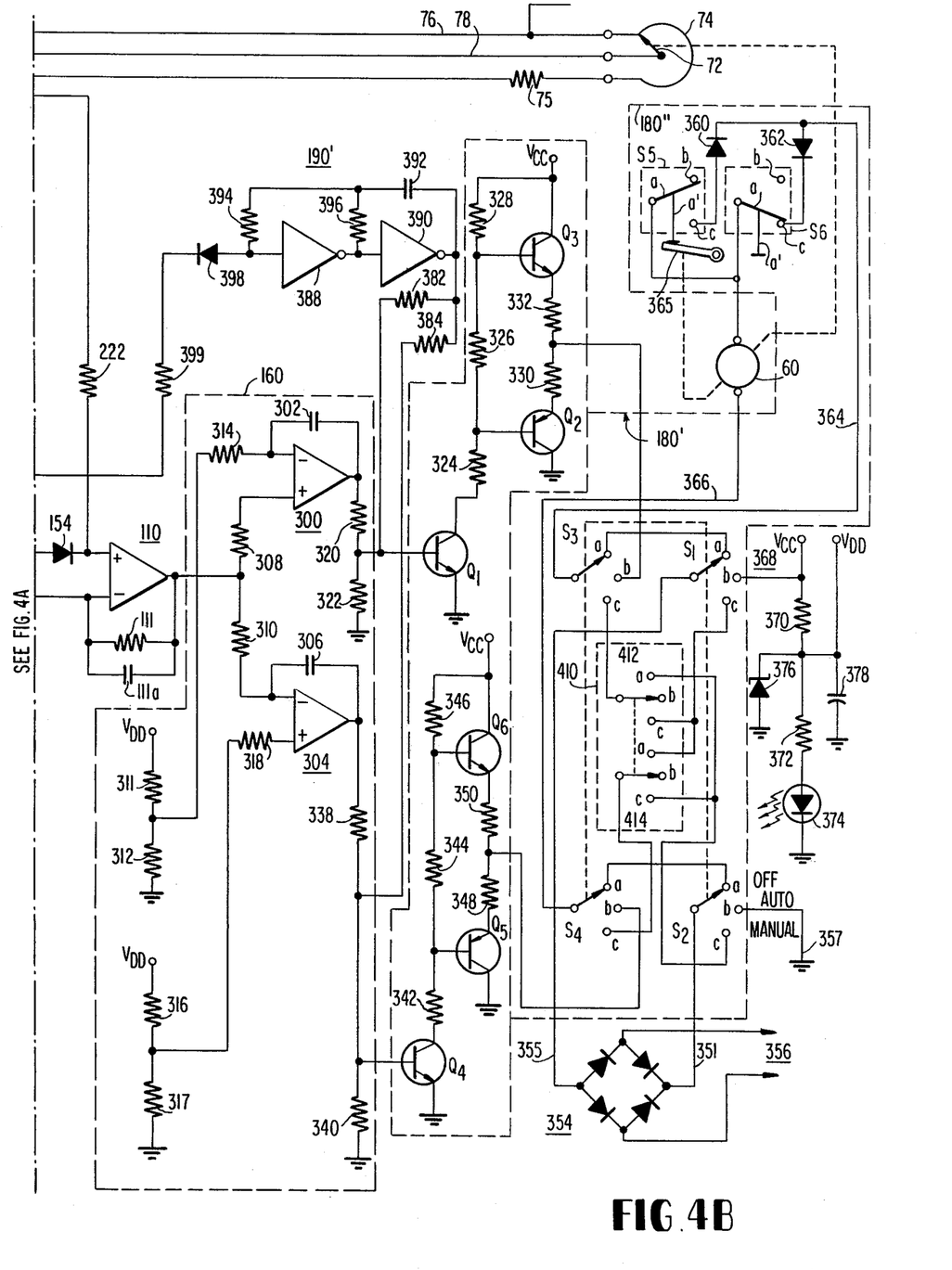

FIGS. 4A and 4B, taken together in side-by-side relationship show in greater detail a control system similar to that of FIG. 3 but not repeating the showing of the mechanical connection of the motor 60 to the dispensing apparatus 34 and the following elements. Where feasible, the same reference characters are used for like parts.

Turning to FIGS. 4A and 4B, the output of the vehicle speed transducer 80 (FIG. 3) is connected through input circuit 182, which matches the output impedance of the transducer, to the amplifier circuit 90. The amplifier 90 includes two non-inverting operational amplifier stages 184 and 186. The second stage 186 may have a non-linear gain characteristic that depends on the magnitude of its output voltage in order to maintain a constant output of material per unit length of travel regardless of variations in truck speed. Thus, this second stage 186 includes a feedback circuit comprising a rheostat 200 connected in parallel with a resistor 202 and a zener diode 204 to the negative output terminal. A resistor 206 connects this negative input terminal of amplifier stage 186 to ground. A gain reduction from a higher speed to a lower speed for the aforementioned purpose may be attained through use of the zener diode 204. With the resistance of the resistor 200 greater than that of 206, a gain reduction from high speed to low speed of the approximate ratio of the resistance of 207 to the sum of the resistances of 200 and 202 may be attained at a selected breakdown voltage of the zener diode 204. The gain of course may be adjusted through rheostat 200.

The amplified output signal from stage 186 is fed through diode 91 to provide half wave rectification of the signal and the signal applied to a parallel resistor-capacitor smoothing network 210. One-to-one correspondence of vehicle velocity to the DC voltage may thereby be provided. The output of smoothing network 210 is connected to one end 212 of voltage divider 100 forming a material volume selector. The other end of the voltage divider is connected to system ground at 216. A movable contact arm 218 is adjustable to select various positions of the voltage across the voltage divider by connection to contacts 220 spaced there along. The movable contact arm 218 is connected through a resistor 222 to the positive input terminal of summing amplifier 110. This impresses on the summing amplifier a DC voltage having a selected relation to the voltage proportional to the vehicle speed as provided at circuit 210.

Threshold detector 120 is provided to cause the auxiliary fluid driven motor (not shown) for driving the auger 22 (FIG. 3) to normally be stopped when the vehicle is not moving. The threshold detector includes an operational amplifier 224, with a capacitor 226 provided in a feedback loop to the negative terminal to cause operation as a comparator. The negative terminal of the amplifier 224 is supplied with the DC vehicle voltage signal from circuit 210 through a buffer resistor 228. A reference voltage is supplied to the positive terminal of amplifier 224 from an intermediate point of a voltage divider which is energized from the DC voltage supply $V_{DD}$. This reference voltage is selected to correspond to the equivalent of the DC vehicle signal voltage provided at circuit 210 by a slowly moving vehicle. If the vehicle is moving slower than the threshold speed, the threshold circuit 120 supplies a high voltage through rectifier 121 to the negative input terminal of summing amplifier 110. Such high voltage will actuate motor 60 cause the auxiliary motor driving the auger 22 to stop in a manner to be described hereinafter. When the vehicle speed is greater than the threshold speed, the voltage that the threshold detector impresses on rectifier 121 will be of a low value having no effect on the circuit operation and normal control of the system in accord with vehicle speed variations will be obtained.

The basic control parameter for the system in addition to vehicle speed is the rate at which the auger 22 is currently being driven by its auxiliary motor. This latter rate is indicative of the position of the control motor 60 and hence of arm 72 of position sensor or potentiometer 70 connected therewith. In FIGS. 4A and 4B, the supply DC voltage $V_{DD}$ is connected to one stator of the potentiometer resistance wire 74 through resistor 75. The other end of resistance wire 74 and the arm 72 are connected through conductors 76 and 78, respectively, to an input circuit 230 to conveyor signal amplifier 130. This input circuit is matched in impedance to the output impedance of sensor or potentiometer 70. The amplifier 130 includes two stages of operational amplifiers 232 and 234. Each stage is non-inverting. The feedback circuit of the second stage 234 includes a potentiometer 236 in series with a resistor 238 to allow adjustment of its gain to obtain the desired amplification. The output of amplifier 130 is connected through a diode 240 to a parallel resistor-capacitor smoothing network 242. The signal on network 242 is connected through a resistor 244 to the negative terminal of the summing amplifier 110.

The blast circuit 150 is an operator triggered monostable multivibrator. It is a normally inactive circuit controllable by an operator for altering the normal operation of the system to force the auxiliary motor for the auger 22 to operate at a maximum rotational velocity for a preselected period of time. A form of the circuit 150 may include an inverter 246 in series with a differentiating network including a capacitor 248 connected to ground through a resistance arm including a resistor 250 in series with a rheostat 252. The differentiated output is connected to another inverter 254, the output of which is fed back through a resistor 256 to the input of inverter 246. A normally open momentary switch 260 is connected between DC supply voltage $V_{DD}$ and input circuit 262 of the first inverter 246. Input circuit 262 includes resistors 263 and 264 and capacitor 266. Momentary closure of switch 260 causes the input of the first inverter 246 to be grounded causing the normally low output of inverter 246 to go high. This causes the output of the second inverter 252 to go low, reinforcing the action of momentary switch 260. The output of the differentiator circuit 248, 250 and 252 decays exponentially toward zero, causing the output of inverter 254 to go high and thereby stop the "blast" cycle. Light emitting diode 255 is connected from $V_{DD}$ through a resistor 255' to the output of inverter 254 to indicate the operating conditions of the blast circuit.

The output of the inverter 246 is also connected to the input of driver inverter circuit 270 which provides the "blast" output on a conductor 272 connected through diode 154 to the positive input of the summing amplifier 110. Conductor 272 also conducts the output of blast circuit 150 through diode 119 to the non-reversing input of the threshold comparator 120. As will become clear hereinafter, this latter connection permits the blast signal to override the threshold circuit 120 so that the blast signal will be effective to cause dispensing of material when the vehicle is stopped or at a low speed where the threshold circuit would ordinarily prevent such dispensing.

A blast delay (power up) circuit 270 may be connected to blast circuit to prevent false operation. This delay circuit includes a resistor 272 connected at one end to voltage supply $V_{DD}$ and at its other end to a capacitor 274 having its other end grounded. The junction of resistor 272 and capacitor 274 is connected through series inverters 276 and 278 to the cathode of a diode 280, the latter having its anode connected to the input terminal of inverter 254.

The summing amplifier 110 comprises a comparator with a resistor 111 and capacitor 111a connected in a parallel feedback circuit to its negative input terminal. The function of this amplifier is to make a comparison of the signals impressed thereon, which comparison determines whether the control motor 60 is positioned to cause the auxiliary motor driving the material discharging auger 22 to rotate too fast or too slow. The factors to be considered are the DC vehicle speed signal, the DC auxiliary motor rotation signal, the speed threshold signal and the blast signal. In the circuit as just described, the DC vehicle speed signal and the "blast" signal are both impressed on the positive or non-inverting input of the operational amplifier 110. The DC auxiliary motor rotation signal and the threshold signal are tied together at the inverting input of the operational amplifier.

The output of the summing amplifier 110, which preferably has a voltage gain of approximately 10, is fed to comparison network 160, which network comprises a "faster" comparator circuit 300 including a feedback capacitor 302 and a "slower" comparator network 304 including a feedback capacitor 306. The output of the summing amplifier 110 is fed through a resistor 308 to the non-inverting positive input of the faster comparator 300 and through a resistor 310 to the inverting negative input to slower comparator 304. The inverting input terminal of the faster comparator is connected to the junction of a voltage divider comprising two resistors 311 and 312 connected between supply voltage $V_{DD}$ and ground to provide a junction voltage of approximately 6 volts that is applied to the terminal through resistor 314. The non-inverting input terminal of the slower comparator is connected to the junction of two resistors 316 and 317 of a voltage divider connected between supply voltage $V_{DD}$ and ground to provide a junction voltage of approximately 5 volts for connection to the terminal through resistor 318.

The circuit is designed so that, when the output voltage of the summing amplifier 110 is less than 5 volts, the output of the slower comparator 304 is +12 volts and the output of the faster comparator 300 is 0 volts. This combination of comparator voltages is such as to cause the DC motor drive circuitry including bridge amplifier 170 and switch system 180' to move the motor 60 in a direction to begin closing the hydraulic valve 6 (FIG. 3) to decrease the rate at which material is dispensed.

When output of the summing amplifier 110 is greater than 6 volts, the output of the slower comparator 304 is 0 volts and the output of the faster comparator 300 is 12 volts. This combination of voltages acts on the DC motor drive circuitry to move the motor 60 in a direction to begin opening the hydraulic valve 46 to increase the rate of dispensing of material by the auger 22.

At times when the output voltage of the summing amplifier is between 5 and 6 volts, the outputs of both the slower comparator 304 and the faster comparator 300 is 0 volts. This combination of comparator voltages will cause the DC drive circuitry to maintain the existing position of the motor 60 and control valve 46 and thereby leave the rate of dispersal of material unchanged. Provision of such a spread of one volt between 5 and 6 volt output of the summing amplifier provides a deadband characteristic reducing limit cycling or hunting of the control motor 60, and hence valve 46, about the desired angular position.

The manner in which outputs of the faster and slower comparators are wired through bridge amplifier 170 to control the motor 60 is illustrated in FIGS. 4A and, particularly, 4B. The output of faster comparator 300 is connected through output resistors 320 and 322 to ground with the junction between these resistors connected to the base of transistor Q1. Transistor Q1 has its emitter grounded and its collector is connected through resistors 324, 326 and 328 in series to voltage $V_{CC}$. A transistor Q2, with its collector grounded, has its base connected through resistors 330 and 332 to the emitter of a transistor Q3. The transistor Q3 has its base connected to the juncture of resistors 326 and 328 and its collector connected to voltage $V_{CC}$. An output terminal from this circuit between resistors 330 and 332 is connected to a terminal in a part 180' of a switch system comprising parts designated 180' and 180".

The output of slower comparator 304 is connected through output resistors 338 and 340 in series to ground with the junction between these resistors connected to the base of a transistor Q4. Transistor Q4 has its emitter grounded and its collector connected through resistors 342, 344 and 346 to voltage $V_{CC}$. A transistor Q5, with its collector grounded, has its base connected to the juncture of resistors 342 and 344 and its emitter connected through resistors 348 and 350 to emitter of a transistor Q6. The base of a transistor Q6 is connected to the juncture of resistors 344 and 346. The output terminal of this circuit at a point between resistors 348 and 350 is connected to a terminal of switch system 180'.

The switch system 180' and 180" for the motor 60 has three positions designated OFF, AUTO (automatic) and MANUAL. Conductors 351 and 355, connected to the switch system are energized from a bridge rectifier 354 which receives its input through leads 356 from the vehicle battery system (not shown). The switch system further includes two pairs of switches 51 and 52, 53 and 54, all ganged together. Thus, the movable arms of these four switches are manually operable in unison so that each of the four arms simultaneously engages the corresponding one of its respective contacts designated a, b or c. Also included in the switch system are switches 55 and 56, which are of the limit type. Each of switches 55 and 56 includes a single movable arm a and two stop type contacts b and c, a being normally biased to engage c. Contacts b are stop members only. Contacts c are connected through one of oppositely poled diodes 360 and 362 and a conductor 364 to the movable contact of switch S3. The movable contacts of a of switches S5 and S6 are connected to a first terminal of motor 60 and the other terminal of motor 60 is connected through conductor 366 to the movable contact of switch S4.

Position a of switches S1, S2, S3 and S4 is the off position. In such position conductor 351 of rectifier 354 is connected through contacts a of switches S2 and S4, conductor 366 and motor 60 is connected through contacts a of switches S1 and S3, the conductor 364 and reversely connected diodes 360 and 362 to contacts c of switches S5 and S6. Movable contacts a of switches S5 and S6 are each provided with a limit actuator a' for engagement by a limit drive arm 365 mechanically drivable in either of opposite directions with motor 60 until it drives an appropriate switch arm a of switch S5 or S6 to the b or stop contact. In this position, the motor 60 has driven the valve 46 (FIG. 3) to a limit position for the auxiliary motor and the energization circuit for the motor is interrupted through the appropriate diode 360 or 362. Movable arm a of the other switch S5 or S6 remains in closed position.

When the switching system is actuated to automatic position (AUTO, FIG. 4) by manually shifting the movable arms of switches S1, S2, S3 and S4 to engage contacts b, switch S1 applies positive potential through conductor 355 from rectifier 354 to a potential control circuit 368, and switch S2 grounds the conductor 351 from the other rectifier terminal at 357. A potential circuit is thus provided including resistors 370 and 372, light emitting diode 374, zenor diode 376 and bypass capacitor 378 arranged as shown to provide substantially uniform DC control potentials at $V_{CC}$ and $V_{DD}$. Light emitting diode 374 indicates that the system is switched to automatic control and that $V_{CC}$ and $V_{DD}$ are energized.

The system being on automatic control, an output of 12 volts is automatically supplied by the faster comparator 300 when the output of the summing amplifier exceeds 6 volts, indicating that more rapid dispensing of material is required. This high voltage output from comparator 300 is impressed on the base of transistor Q1 causing it to conduct. Transistor Q2 will also conduct and transistor Q3 will be prevented from conducting. At the same time, transistor Q4 is not rendered conducting by slower comparator 304, transistor Q5 does not conduct and transistor Q6 is conducting. In this condition, current will flow from supply $V_{CC}$ through Q6, resistor 350, contact b of S4, conductor 366, motor 60, switch 55, diode 360, conductor 364, contact b of switch S3, resistor 330 and transistor Q2 to ground. Current passes through the motor 60 in a direction causing it to move the valve 46 (FIG. 3) in opening direction along with the potentiometer arm 72 attached to the valve until the automatic control circuit is balanced in a condition in which the output of the summing amplifier is less than 6 volts and the high voltage output of the faster comparator 300 ceases.

When material is being dispensed too rapidly by the auxiliary motor, the output of the summing amplifier 110 is less than 5 volts, the faster comparator output is 0 volts but the slower comparator 304 has an output of 12 volts. The resulting high voltage on the base of transistor Q4 causes it to conduct. Transistor Q5 conducts also while transistor Q6 is non-conducting. At the same time, transistor Q1 and Q2 are non-conducting and transistor Q3 conducts. As a result, current will flow from $V_{CC}$ through Q3, resistor 332, switch 53 including contact b, conductor 364, rectifier 362, switch 56, motor 60, conductor 366, switch 54 including contact b, resistor 348, and transistor Q5 to ground. Passage of current through control motor 60 in this direction will cause the control motor to drive the auxiliary motor valve 46 (FIG. 3) and the potentiometer arm 72 in the opposite direction toward a balanced condition when the output of the summing amplifier 110 is less than 5 volts.

An astable oscillator 190' may be provided to provide pulse width control to the motor drive through resistors 382 and 384 connected to the output circuits of the comparators 300 and 304, respectively. The astable oscillator may include a pair of series connected inverters 388 and 390, with a feedback circuit extending from the output of 390 through a capacitor 392 and a resistor 394 or 396 to the inputs of the respective inverters. The input of inverter 388 is connected through a diode 398 and resistor 399 to the output terminal of a third inverter 400. The input of inverter 400 is connected to supply voltage $V_{DD}$ through a resistor 402 and to the collector of a transistor Q. The emitter of transistor Q is grounded and the base thereof connected through resistor 404 to DC vehicle speed voltage output of circuit 210.

Also connected to the output terminal of the inverter 400 is a circuit including a resistor 406 and a light emitting diode 408 connected in series to supply voltage $V_{DD}$. The diode 408 will act as an indicator, operating when the output voltage at circuit 210 is below a preselected DC value necessary to render Q conducting and ground input to inverter 400.

The purpose of the astable oscillator 190' is to provide pulse width modulation to the motor drive control and thereby permit adjustment of the system gain. This feature lowers system gain and aids in stabilizing the system response while making a slight sacrifice in system accuracy. When the astable signal of the oscillator 190' is 0 volts, the faster and slower signals from the comparators act on the transistors Q1 and Q2 as previously described. However, when the astable oscillator provides a signal of +12 volts, the faster and slower comparators are inhibited and the voltage that would otherwise be applied to the motor 60 is shut off.

Referring back to the threshold detector circuit 120, it will be recalled that this circuit produces a high voltage output when the vehicle is moving at less than threshold speed. Since the threshold circuit voltage is impressed on the negative or inverting terminal of the summing amplifier 110, a high voltage thereon will, in the absence of a "blast" pulse, result in the output of the amplifier being less than 5 volts. Accordingly, the output of the slower comparator is +12 volts and the output of the faster comparator is 0 volts. The bridge amplifier 170 therefore will operate in the manner described above to drive the motor 60 in a direction to cause the auxiliary motor control valve 46 to prevent dispensing material.

The blast circuit 150 is manually controlled, and it operates to cause a maximum amount of material to be dispensed, overriding the other controls completely, including the threshold detector. Thus, momentary actuation of blast switch 260 not only provides a high voltage signal through conductor 272 to the non-inverting terminal of summing amplifier 110, but it likewise impresses such a voltage on the threshold circuit through diode 119 to insure that the latter circuit is not activated. Accordingly, the output voltage of the summing amplifier is greater than 6 volts. The output of the slower comparator is 0 volts and the output of the faster comparator is 12 volts. The bridge amplifier therefore operates the motor 60 to drive the auxiliary motor control valve 46 to increase speed of dispersion. Ordinarily the blast duration control potentiometer will be adjusted so that the blast duration is adequate to drive the auxiliary motor at its maximum speed. The limit drive arm 365 and stop contact b of the appropriate switch 55 or 56 insures breaking the drive circuit for motor 60 when the maximum speed is reached.

The operation of the comparator network may be discussed in more detail in connection with the preferred characteristic of the summing amplifier 110 having a gain of approximately 10. If the voltage at the positive terminal of the summing amplifier 110, which is determined by vehicle speed signal and, if it is on, the "blast" signal is approximately 0.60 volts greater than the voltage at the negative terminal, which is determined by the auxiliary motor position or threshold signal, the resulting output voltage of the summing amplifier will be greater than 6 volts. This will cause the faster comparator 300 to be at +12 volts and result in driving the control motor 60 in a direction to increase the velocity of the auxiliary motor operated through valve 46. If the aforementioned voltage difference is less than 0.50 volts, the resultant output voltage of the summing amplifier will be less than 5 volts. This will cause the slower comparator 304 to provide an output of +12 volts and drive motor 60 in the direction to decrease the rotational velocity of the auxiliary motor. If the input voltage across the input terminals of summing amplifier is beteen 0.50 and 0.60 volts, the output voltage will be between 5 and 6 volts and will not cause the comparators to move the control motor 60 to change the speed of the auxiliary motor.

Manual control of the dispensing of material is attained through actuation of the ganged switches S1, S2, S3 and S4 to engage contacts c and selective operation of a manual motor control circuit 410. This circuit 410 includes ganged contacts 412 and 414 connected to contact c of switch S3 and the movable contact of switch S4, respectively. Contacts 412 and 414 each cooperate with a group of stationary contacts a, b and c, respectively. Movement of switches 402 and 404 between their respective stationary contacts a and c simultaneously reverse the direction of energization of motor 60 from rectifier 354 to cause movement of the auxiliary motor valve 46 (FIG. 3) in opposite directions to increase or decrease the speed of the latter motor and the rate of dispensing material. Movement of the switches 412 and 414 to engage their unconnected stationary contacts c discontinues energization of control motor 60 and stops movement of valve 46 for the auxiliary motor, leaving the rate of dispersion of material at the value previously selected.

The various manually operated controls, as those for selecting between automatic, manual and off positions and the potentiometer 218 for selecting material volume, are preferably located on a control panel in a convenient central position such as in the cab 14 of the vehicle 10.

While the present invention has been described in conjunction with a hydraulically-operated auxiliary motor for driving the mechanism for dispensing the material, it will be appreciated that other driving means including an auxiliary combination engine or an auxiliary electric motor might be used under the control of the described control system. Likewise, component electrical circuits known in the art that are different than those specifically described here might be used to obtain the same control effects of various circuit elements such as the blast circuit, astable oscillator and the like.

Still other modifications and variations of the invention will be evident to persons of ordinary skill in the art. It is intended, therefore, that the foregoing detailed description of the invention as illustrated in the drawing be considered as exemplary only and that the scope of the invention be determined from the following claims.

What is claimed is:

1. In a mobile material spreader including a prime mover, a material storage means associated with the prime mover, a material spreading means for spreading material during movement of the prime mover, control means for controlling the spreading rate of the material spreading means in accordance with the prime mover speed of movement, the improvement comprising:
   manually operable control over-ride means for automatically increasing the spreading rate of the spreading means from a base rate to a previously selected increased rate, for automatically maintaining said increased rate for a preselected interval of time and for automatically returning to said base rate after said interval of time.

2. In a material spreading vehicle having prime mover means:
   an auxiliary driven mechanism carried by said vehicle for discharging material from said vehicle at a rate adjustable in accordance with the position of an adjustable control member in the mechanism;
   control motor means operable in response to the amplitude and polarity of a control signal applied thereto to adjust the position of said adjustable control member throughout a predetermined range; and
   circuit means for applying a control signal to said control motor means including:
      first transducer means for providing a first voltage related in amplitude to the speed of said vehicle;
      second transducer means for providing a second voltage related in amplitude to the position of said control member;
      comparator means receiving voltages related to said first and second voltages and normally operative to provide said control motor means with a direct current signal related in amplitude and polarity to the difference between said first and second voltages; and
      blast means including switch means operable to impress on said comparator means a blast voltage of a magnitude and polarity such as to cause said comparator means to impress a voltage on said control motor means to cause it to drive said adjustable control member in a direction to increase the rate of discharge of the material irrespective of the amplitudes of said first and second voltages.

3. The combination as recited in claim 2 wherein said circuit means further includes means for adjusting the relationship between the amplitude of said first voltage and the speed of the vehicle.

4. The combination as recited in claim 2 wherein said blast means is operable in response to momentary operation of its said switch means to provide a blast voltage of predetermined duration.

5. The combination recited in claim 4 wherein the predetermined duration of the blast voltage is adjustable and said comparator means returns to an operative condition independent of the blast voltage upon termination thereof.

6. The combination as recited in claim 2 wherein said means including said first transducer means includes threshold means operable in response to the amplitude of said first voltage falling below an amplitude corresponding to a predetermined vehicle speed to cause the impression of said comparator means of a voltage effective to drive said control motor means to bring said adjustable control member to a position to cause discontinuance of the discharge of the material in the absence of imposition of the blast voltage on said comparator means.

7. In a vehicle having prime mover means:
an auxiliary driven mechanism carried by said vehicle for discharging material from said vehicle at a rate adjustable in accordance with the position of an adjustable control member in the mechanism:
control motor means;
coupling means for drivingly connecting said control motor means to said adjustable control member;
circuit means for applying a control signal to said control motor means including:
means including first transducer means for providing a first voltage related in amplitude to the speed of said vehicle;
means for providing a second voltage related in amplitude to the position of said adjustable control member;
means including comparator means for receiving voltages related to said first and second voltages and normally operative to provide said control motor means with a direct current input representative in amplitude and polarity of the amount said adjustable control member differs in position from a position indicative of a predetermined relationship to the speed of said vehicle; and
threshold means operable in response to the amplitude of said first voltage falling below an amplitude corresponding to a predetermined vehicle speed to cause the impression on said means including comparator means of a third voltage to provide said control motor means with a direct current input of an amplitude and polarity such as to cause said control motor means to drive said adjustable control member in a direction to stop discharge of material irrespective of the amplitudes the voltages related to said first and second voltages.

8. The combination recited in claim 7 wherein said control means further includes means for adjusting the relationship between the amplitude of the voltage related to the said first voltage and the speed of the vehicle.

9. The combination as recited in claim 7 wherein said means including first transducer means includes amplifier means for amplifying transducer voltages produced below a predetermined vehicle speed with a higher gain than transducer voltages produced at vehicle speed exceeding said predetermined speed to provide substantially a one-to-one correspondence between said vehicle speed and the amplitude of said first voltage.

10. The combination as recited in claim 7 wherein is further included:
blast means including switch means manually operable to impress on said means including comparator means a blast voltage of a magnitude and polarity such as to cause said means including comparator means to impress a voltage on said control motor means to cause said control motor means to rapidly drive said adjustable control member in a direction to increase the rate of discharge of the material irrespective of the amplitude of any other voltages impressed on said means including comparator means.

11. In combination with a vehicle capable of being propelled and including means for discharging material from said vehicle at a rate adjustable in accordance with the position of an adjustable control member;
control means operable in accordance with the amplitude and polarity of a control signal applied thereto to change the position of said adjustable control member a corresponding amount and direction;
circuit means including first transducer means providing a first signal related in amplitude to the speed of the vehicle;
means including second transducer means for providing a second signal related in amplitude to the position of said adjustable control member;
comparator means for receiving signals at at least a pair of input terminals and impressing a control signal related in amplitude and polarity to the difference in signals applied to said input terminals to said control means;
means for impressing said first and second signals to said comparator means;
threshold means responsive to said first transducer means for providing a third signal when the speed of said vehicle is below a preselected value; and,
means applying said third signal to one of said terminals of said comparator means such as will effect the output signal of said comparator means in an opposite manner to an increase in the amplitude of said first signal.

12. In combination with a vehicle capable of being propelled and including means for discharging material from said vehicle at a rate adjustable in accordance with the position of an adjustable control member;
control means operable in accordance with the amplitude and polarity of a control signal applied thereto to change the position of said adjustable control member a corresponding amount and direction; and
circuit means including a first transducer means providing a first signal related in amplitude to the speed of the vehicle;
means including second transducer means for providing a second signal related in amplitude to the position of said adjustable control member;

comparator means for receiving signals at at least a pair of input terminals and impressing a control signal related in amplitude and polarity to the difference in signals applied to said input terminals to said control means;

means for impressing said first and second signals to said comparator means;

means operable in response to momentary actuation of a switch to produce a blast signal of preselected amplitude and duration; and, means applying said blast signal to one of said terminals of said comparator means to override any other signals applied to said comparator means and provide an output signal such as will actuate said control means in a manner to move said control member in a direction to increase the rate of discharge of material from said vehicle.

13. The combination as recited in claim 11 wherein is further included:

means operable in response to momentary actuation of a switch to produce a blast signal of preselected amplitude and duration;

means applying said blast signal to said threshold means to prevent said threshold means from providing an effective third signal; and means applying said blast signal to one of said terminals of said comparator means to override any other signals applied to said comparator means and provide an output signal that actuates said control means to move said adjustable control member in a direction to increase the rate of discharge of material from said vehicle.

* * * * *